United States Patent
Chen

(10) Patent No.: US 6,795,861 B2
(45) Date of Patent: Sep. 21, 2004

(54) DYNAMIC CONTROLLING METHOD FOR FIELD AUTHORITY AND SYSTEM THEREOF

(75) Inventor: Chi-Chung Chen, Shin-Tien (TW)

(73) Assignee: Acroprise Inc., Shin-Tien (TW)

( * ) Notice: Subject to any disclaimer, the term of this patent is extended or adjusted under 35 U.S.C. 154(b) by 774 days.

(21) Appl. No.: 09/765,615

(22) Filed: Jan. 22, 2001

(65) Prior Publication Data

US 2002/0099835 A1 Jul. 25, 2002

(51) Int. Cl.[7] .............................................. G06F 13/00
(52) U.S. Cl. ..................... 709/229; 709/226; 713/200; 713/201
(58) Field of Search .............................. 709/229, 226, 709/220, 221, 222, 223; 713/200, 201

(56) References Cited

U.S. PATENT DOCUMENTS 5,263,158 A * 11/1993 Janis ............................ 707/1
5,414,844 A * 5/1995 Wang ........................ 713/200
6,189,032 B1 * 2/2001 Susaki et al. ............... 709/225
6,615,257 B2 * 9/2003 Lee et al. .................... 709/222

FOREIGN PATENT DOCUMENTS

EP          0447339 A2 * 9/1991

* cited by examiner

Primary Examiner—Kenneth R. Coulter
(74) Attorney, Agent, or Firm—Bacon & Thomas PLLC

(57) ABSTRACT

Dynamic controlling method for field authority and system thereof. An authority manager defines meta information of data schema. The meta information includes the authority rating of each operation function in each field. A table manager is used to set a user's authority rating according to personal authority. When loading the view of a process instance, a view runner compares authority rating of each operation function in each field with the user's authority rating and then according to preset rules and with the comparison result, loads the field into the view and produces corresponding field operation function.

6 Claims, 3 Drawing Sheets

DYNAMIC CONTROLLING METHOD FOR FIELD AUTHORITY AND SYSTEM THEREOF

BACKGROUND OF THE INVENTION

The present invention is related to a dynamic controlling method for field authority and system thereof. A user's authority rating set according to personal requirement is compared with the preset authority rating of each operation function in each field with the user's authority rating. Then, according to preset rules and with the comparison result, the field is loaded into the view VA to produce corresponding field operation function. Accordingly, the field authority can be motively controlled.

FIG. 1 shows a flow chart of the controlling method for field show and operation authority of the conventional process instance. First, in step 11 "setting attribute of operation function of respective fields according to user's authority" the operation function of the respective process instances and fields is only distinguished in Y/N attribute. For example, a manager can only one by one set the attribute whether the process instance can be shown and whether the field data can be queried, edited, deleted, inserted, etc. After set, the manager stores it in a database. After the user registers the execution program or system, a step 12 "loading view" is executed. Thereafter, in step 13 "program logically decides field to produce corresponding operation and field function", the execution program or system, according to the aforesaid logical setting of attribute of the respective fields, directly brings out relevant using function of the process instance and field meeting the set condition Accordingly, the field authority can be basically controlled and managed.

However, prior to use of such conventional controlling/ managing method for field authority in the process instance, it is necessary to set the attribute of the user's operation authority with respect to the respective fields and process instances. This setting pertains to general basic setting in normal state. (For example, when the user executes a certain process instance, all the field data will be completely shown in the view and the preset field operation function can be executed.) However, with respect to the show of certain specific fields and the setting of data operation thereof, for example, when a user without sufficient authority executes a certain accountant operation and desires the confidential data of "unit cost" field not to be shown for confidence, the user must particularly additionally set a program code as a judgment basis for execution of program or system. Such setting is quite complicated and inconvenient. When the authority of the user changes, the manager not only has to check the attribute setting of the operation authority of the process instance and the field of the execution program or system, but also needs check the set program code with respect to the specific field and modifies the program code as necessary so as to achieve the function meeting the user's authority. This is laborious and time-consuming and often causes error. As a result, the managing system of a corporation is often hard to motively adjust the managing mode according to actual requirement. Therefore, the use of the conventional controlling/managing method for field authority is unchangeable and can hardly satisfy the requirement of modern corporation for efficiency.

SUMMARY OF THE INVENTION

It is therefore a primary object of the present invention to provide a dynamic controlling method for field authority and system thereof. An authority manager defines meta information of data schema. The meta information includes the authority rating of each operation function in each field. A table manager is used to set a user's authority rating with respect to the respective fields according to personal authority. When loading the view of a process instance, a view runner compares authority rating of each operation function in each field with the user's authority rating and then according to preset rules and with the comparison result, loads the field into the view and produces corresponding field operation function. Accordingly, the field authority can be motively controlled to fulfill the requirements of economy and efficiency.

It is a further object of the present invention to provide the above a dynamic controlling method for field authority and system thereof, in which the show of specific fields data in the respective process instance and the setting of the respective operation functions totally are not controlled by any program code. Therefore, the shortcoming existing in the conventional setting of the program code can be eliminated and the variability in use can be enhanced.

The present invention can be best understood through the following description and accompanying drawings wherein:

DETAILED DESCRIPTION OF THE PREFERRED EMBODIMENTS

Figure 1:
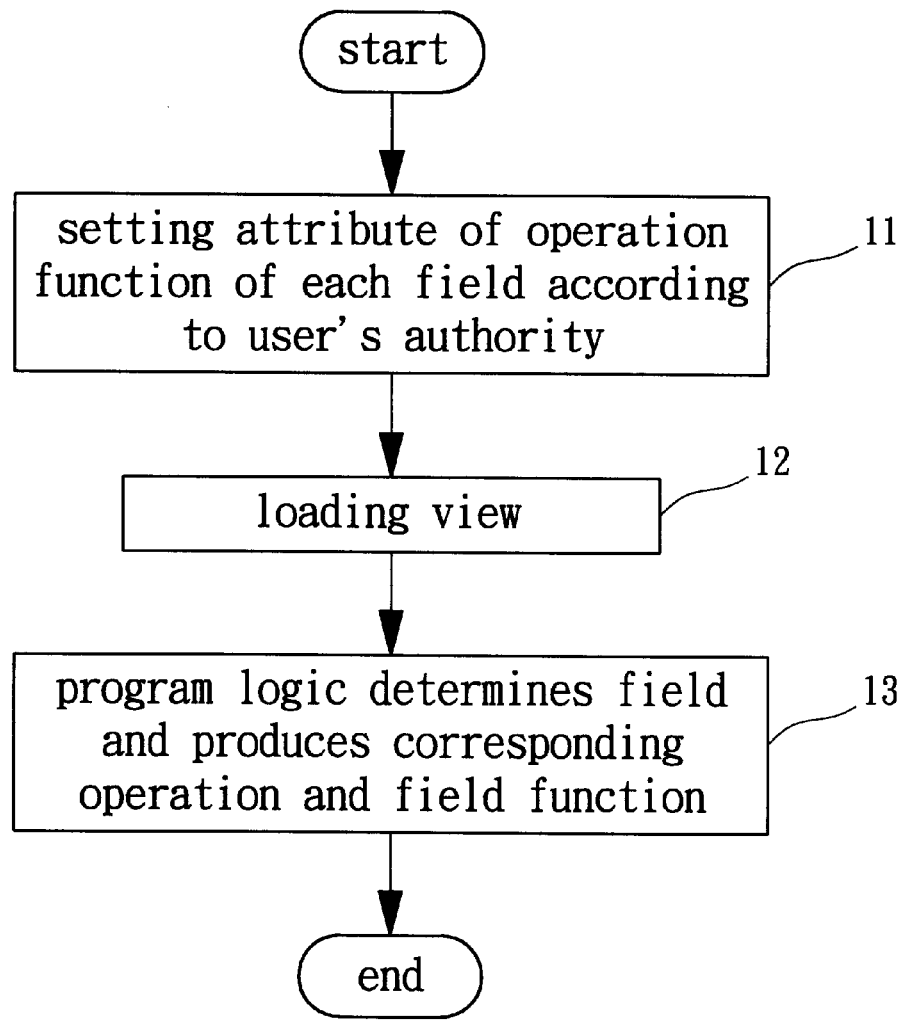
FIG. 1 is a flow chart of a conventional controlling/ managing method for field authority.
Figure 2:
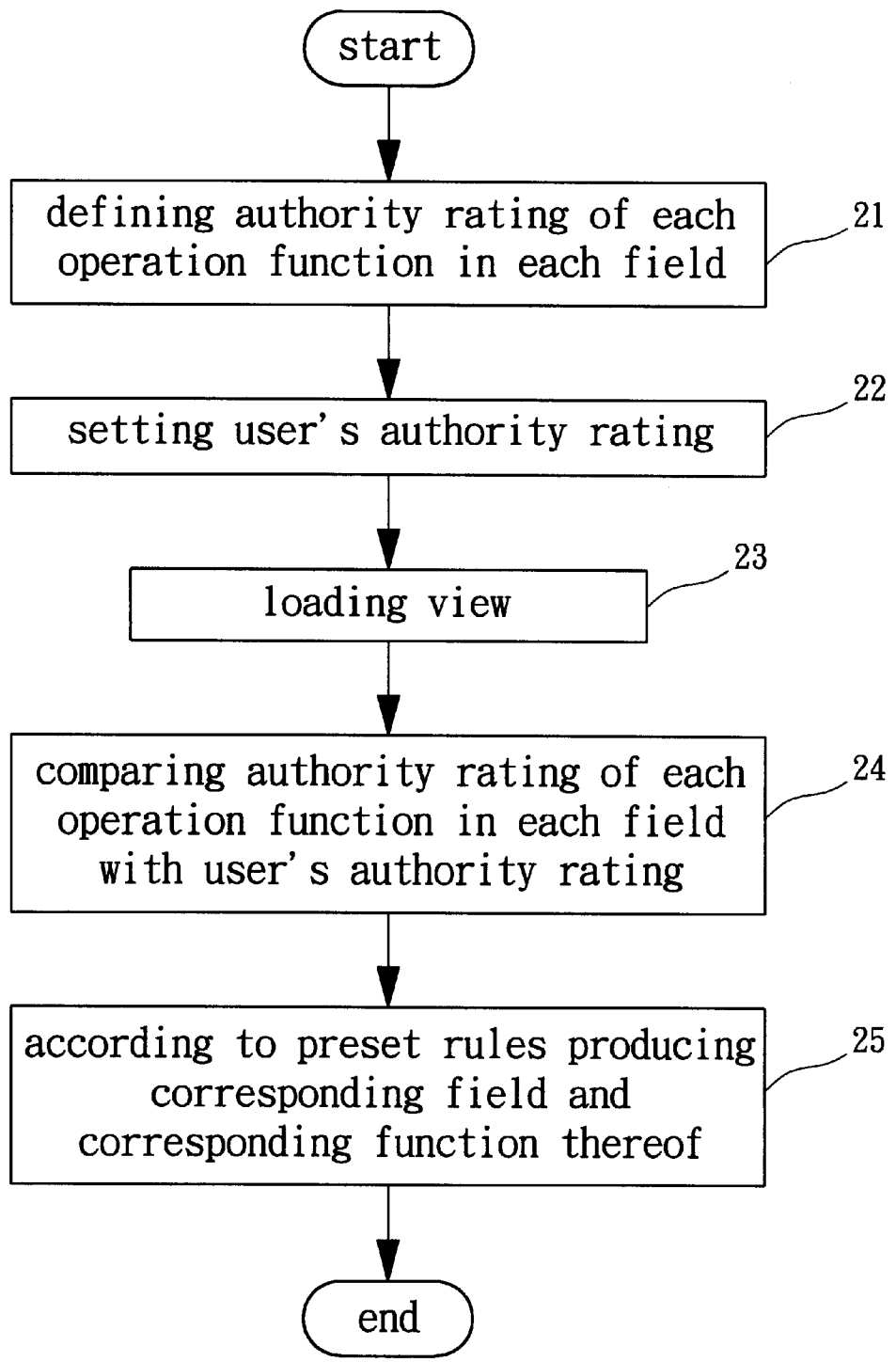
FIG. 2 is a flow chart of a preferred embodiment of the controlling method of the present invention.

FIG. 2 is a flow chart of the method of the present invention, which includes: step 21 "defining authority rating of each operation function in each field", step 22 "setting user's authority rating", step 23 "loading view", step 24 "comparing authority rating of each operation function in each field with user's authority rating" and step 25 "according to preset rules producing corresponding field and corresponding function thereof". In step 21 "defining authority rating of each operation function in each field", when defining meta information of data schema, the authority rating of each operation function of all fields in each process instance in meta information is set into a different group of numerals (which can be fractions or different constants) according to the characteristic thereof. In step 22 "setting user's authority rating", a user's authority rating is set according to the position and need in duty of the user or in consideration of other factors. The numerals of the authority rating are presented in the same form as the aforesaid "field authority rating". After the user registers the execution program or system and executes steps 23 "loading view", the execution program or system automatically executes step 24 "comparing authority rating of each operation function in each field with user's authority rating". The comparison principle is based on different logic symbols "≧", "<" or other measures and induced. Then, in step 25 "according to preset rules producing corresponding field and corresponding function thereof", the comparison result produces corresponding field show and relevant operation function according to preset rules.

For example, the authority rating of each operation function of a certain field A of a certain process instance is set as follows:

1. Show: (20/100)(or 20);
2. Edit: (40/100)(or 40);
3. Insert: (60/100)(or 60); and
4. Delete: (80/100)(or 80).

The comparison principle can be: In the case that "user's authority rating"≧"authority rating of field operation function", the process instance (view) can execute corresponding process or operation, while in the case that "user's authority rating"<"authority rating of field operation function", the process instance will not execute corresponding process or operation.

In the case that the field authority rating of a user is set (60/100)(or 60), the opened process instance (view) can "show" the field A and has the functions of "editing" and "inserting" data of the field A. (This is because "user's authority rating">"authority rating of field operation function".) However, the process instance has no function of "deleting" data of field A. (This is because "user's authority rating"<"authority rating of field operation function")

In the case that the field authority rating of a user is set (15/100)(or 15), the opened view cannot even show the field A, not to mention execution of the other functions of "edit", "insert" "and delete".

The above comparison principle is a simple embodiment of the present invention. The embodiment can be modified. For example, the judgment can be made on the basis of logic rule of "user's authority rating"≦"authority rating of field operation function". This can achieve equivalent effect.

Figure 3:
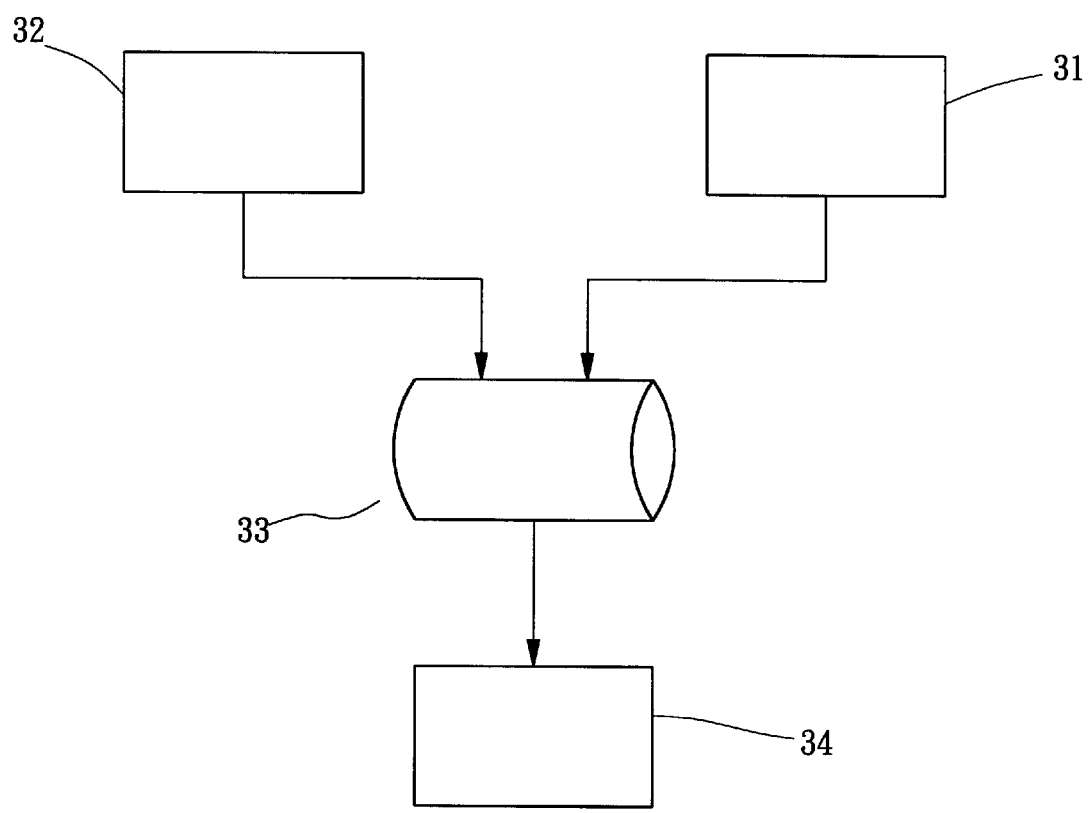
FIG. 3 is a block diagram of the controlling system of the present invention according to the flow chart of FIG. 2.

FIG. 3 is a block diagram of the structure according to the flow chart of FIG. 2. The structure of the present invention includes an authority manager 31, a table manager 32 and a view runner 34 respectively connected with a database 33. The authority manager 31 serves to execute step 21 "defining authority rating of each operation function in each field". After defined, the data of the authority rating of each operation function in each field are stored in the database 33. The table manager 32 serves to execute the step 22 "setting user's authority rating". After set, the data of the user's authority rating are also stored in the database 33. Finally, when loading the view, the view runner 34 executes the step 24 "comparing authority rating of each operation function in each field with user's authority rating" and step 25 "according to preset rules producing corresponding field and corresponding function thereof".

In conclusion, the dynamic controlling method for field authority and the system thereof of the present invention are able to simplify the setting of user's authority and make the use of the authority more variable.

The above embodiments are only used to illustrate the present invention, not intended to limit the scope thereof.

Many modifications of the above embodiments can be made without departing from the spirit of the present invention.

What is claimed is:

1. Dynamic controlling system for field authority, comprising:
    an authority manager for defining authority rating of each operation function in each field;
    a table manager for setting user's authority rating; and
    a view runner which when loading the view, compares authority rating of each operation function in each field with the user's authority rating and then according to preset judgment rules, produces corresponding field function.

2. Dynamic controlling system for field authority as claimed in claim 1, wherein the defined authority rating data of each operation function in each field and the set user's authority rating data are stored in a database.

3. Dynamic controlling method for field authority, comprising steps of:
    defining authority rating of each operation function in each field, each operation function of each field in the process instance being set into a different authority rating according to the characteristic thereof;
    setting user's authority rating, a user's authority rating being set according to the need of the user, the numerals of the authority rating being presented in the same form as said rating of each operation function in each field;
    comparing authority rating of each operation function in each field with user's authority rating, when loading the view, the execution program or system automatically comparing said field authority rating with the set user's authority rating; and
    according to preset rules, producing corresponding field and corresponding function thereof, the comparison result producing corresponding field show and relevant operation function according to preset logic rules.

4. Dynamic controlling method for field authority as claimed in claim 3, wherein the user's authority rating and authority rating of each operation function in each field are presented in form of fractions.

5. Dynamic controlling method for field authority as claimed in claim 3, wherein the user's authority rating is compared with the authority rating of each operation function on the basis of logic rule of "≧", "<", etc. for distinguishing the corresponding operations of the respective fields.

6. Dynamic controlling method for field authority as claimed in claim 5, wherein the corresponding operations of the respective fields include showing field data, editing field data, inserting field data and deleting field data.

* * * * *